(12) United States Patent
Gibson

(10) Patent No.: US 7,051,909 B2
(45) Date of Patent: May 30, 2006

(54) CARRIER FOR BICYCLES AND OTHER CARGO

(76) Inventor: Verlin V. Gibson, 7 Cedar Fork Ct., Defiance, MO (US) 63341

( * ) Notice: Subject to any disclaimer, the term of this patent is extended or adjusted under 35 U.S.C. 154(b) by 364 days.

(21) Appl. No.: 10/635,090

(22) Filed: Aug. 6, 2003

(65) Prior Publication Data

US 2004/0084491 A1    May 6, 2004

Related U.S. Application Data

(60) Provisional application No. 60/423,517, filed on Nov. 4, 2002.

(51) Int. Cl.
*B60R 9/06*    (2006.01)
(52) U.S. Cl. .............. 224/403; 224/550; 224/552; 224/571; 224/924
(58) Field of Classification Search ............. 224/403, 224/405, 547, 548, 550, 552, 571, 924
See application file for complete search history.

(56) References Cited

U.S. PATENT DOCUMENTS

| | | | | |
|---|---|---|---|---|
| 3,785,517 A | * | 1/1974 | Brajkovich | .......... 414/462 |
| 3,912,139 A | * | 10/1975 | Bowman | .......... 410/3 |
| 4,236,854 A | * | 12/1980 | Rogers | .......... 410/121 |
| 5,127,564 A | * | 7/1992 | Romero | .......... 224/403 |
| 5,603,439 A | * | 2/1997 | Pineda | .......... 224/403 |
| 5,611,472 A | * | 3/1997 | Miller | .......... 224/403 |
| 6,179,181 B1 | * | 1/2001 | Johnson et al. | .......... 224/405 |
| 6,726,073 B1 | * | 4/2004 | Sutton | .......... 224/405 |
| 2002/0092884 A1 | | 7/2002 | Fleissner | |

* cited by examiner

*Primary Examiner*—Stephen K. Cronin
(74) *Attorney, Agent, or Firm*—Polster, Lieder, Woodruff & Lucchesi, L.C.

(57) ABSTRACT

A cargo carrier (10) for bicycles (Y1, Y2) is removably installable in the bed (B) of a truck (T) and has a base plate (12) which mounts on top of the truck bed. One side of the base plate bears against one wall (W1) of the truck bed and an adjustable stop (14) is adjustable to bear against the opposite wall (W2) so to allow the carrier to be installed in trucks having different bed widths. Saddles (40) have risers (42) extending vertically upwardly from the base plate. An attachment screw (62) extending between the risers is used for securing bicycles to the carrier. The base plate may include an offset section so two bicycles can be carried in a side-by-side, staggered formation. The saddles are removable and can be replaced with posts or mounts for carrying other items in the bed. The carrier is in kit form for quick assembly, when needed.

22 Claims, 11 Drawing Sheets

CARRIER FOR BICYCLES AND OTHER CARGO

CROSS REFERENCE TO RELATED APPLICATIONS

Provisional patent application Ser. No. 60/423,517 filed Nov. 4, 2002.

STATEMENT REGARDING FEDERALLY SPONSORED RESEARCH OR DEVELOPMENT

N/A

BACKGROUND OF THE INVENTION

This invention relates to the transportation of bicycles, motorcycles, and other cargo which is loaded into the bed of a pickup truck or the like, and in particular, to a carrier which is removably installed in the truck bed for conveniently and safely transporting this type of cargo.

Many people enjoy taking their bicycles or motorcycles to remote areas some distance from their homes. There they can ride them over trails or roads not otherwise available to them. Often these vehicles are transported to the riding area in the back of a pickup truck. To prevent damaging bicycles in transit, the bike must be lashed down or otherwise secured so as the pickup truck goes to and from the riding area especially on rough or unpaved roads, the bicycle is not damaged. Frequently, more than one bicycle is transported in the truck and each bike must be secured so that they are not damaged by the ride and do not damage the other vehicle or the pickup.

In addition to recreational transport, there is the commercial transport of many other objects in pickup trucks. These objects can be large, expensive, bulky items that also need to be securely stored in the back of the pickup truck for safe transport. Numerous problems arise in this regard. One is the ease and convenience with which these items can be loaded onto the truck, safely stored; and readily off-loaded at their destination. Another problem is that objects of one size and shape may be transported from one place to another, but then objects of different sizes and shapes need to be moved from the first destination to a second. A third problem is that the sizes and shapes of truck beds vary from one model pickup to another. This may make it difficult to easily on-load and safely store bicycles or the other objects.

The present invention is directed to a cargo carrier for the safe and convenient transport of bicycles and other objects. Others have tried to provide a cargo carrier or truck bed rack to address this problem. See, for example, US Patent Office publication number US/2002/0092881 A1. However, the present invention has advantages over these other approaches. In addition, various types of ropes or other tie downs are currently available, but all do not provide the level of safety provided by the present invention.

BRIEF SUMMARY OF THE INVENTION

The present invention comprises a cargo carrier which is removably installable in the bed of a pickup truck or the like. The carrier comprises a base plate which rests on top of the truck bed. The length of the base plate is slightly less than the width of the bed for one side of the base to rest against one wall of the truck bed and the other side to stop just short of the opposite sidewall. An adjustable stop is adjustable to bear against the opposite wall of the bed to install the base plate in place. This adjustability allows the carrier to be conveniently used with pickup trucks of different bed widths.

One or more saddles (for holding bikes and other articles) are mounted in tracks which extend transversely of the truck bed and extend vertically upwardly from the base plate. Each saddle includes two risers, and the saddles are movable in the tracks to adjust their positions relative to each other. In one embodiment, one side of the base plate is offset from the other side of the plate so the bikes mounted in the saddles are offset or staggered from, and do not interfere with, each other. In another embodiment, the base plate has different sets of tracks with the saddles being separately mounted in different sets of tracks to provide the offset. Staggering prevents the handlebars of the bikes from getting tangled with each other and allows them to be carried side-by-side in the back of the pickup without damaging each other. Up to three bikes can be mounted side-by-side in the bed of the truck using this staggered arrangement.

The risers are separately movable in whichever sets of tracks they are installed so that the bikes (or other articles) of different sizes can be simultaneously carried in the back of a pickup without damaging each other. The inner surface of each riser includes pads which cushion the bikes or other articles during transport and prevent damage to them.

The saddles are removable and can be replaced with posts or other types mounts for carrying other items in the truck bed. The carrier is made of wood, a heavy duty metal, or a high impact plastic. The base plate can be formed in sections which are detachable from each other when the carrier is not in use so to facilitate easy storage of the carrier. The carrier can be stored in a bag or small case or box which can be placed in the bed of the truck for quick access when needed, placed inside a cab portion of the pickup, or stored in a garage or shed.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 15:
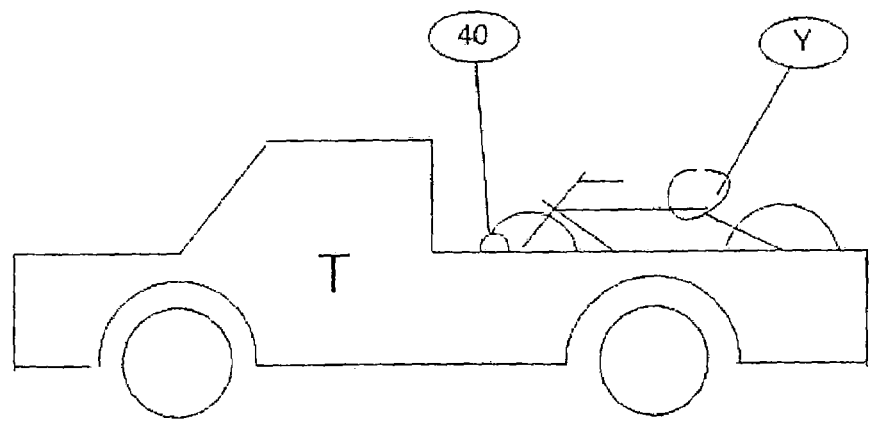

The present invention comprises a cargo carrier 10 or 10' (see FIG. 8) which is removably installable in the bed B of a pickup truck T. As shown in the embodiment of the drawings, carrier 10 is used to transport one or more bicycles Y conveniently mounted in an upright position in the back of the truck. This is as shown in FIG. 15. Carrying the bicycles in this manner makes it easier to place them into, and remove them from, the truck and prevents damage to the bicycles while in transit. Those skilled in the art will appreciate that motorcycles or other objects can be carried in the bed of the truck in the same manner as the bicycles.

Figure 1:
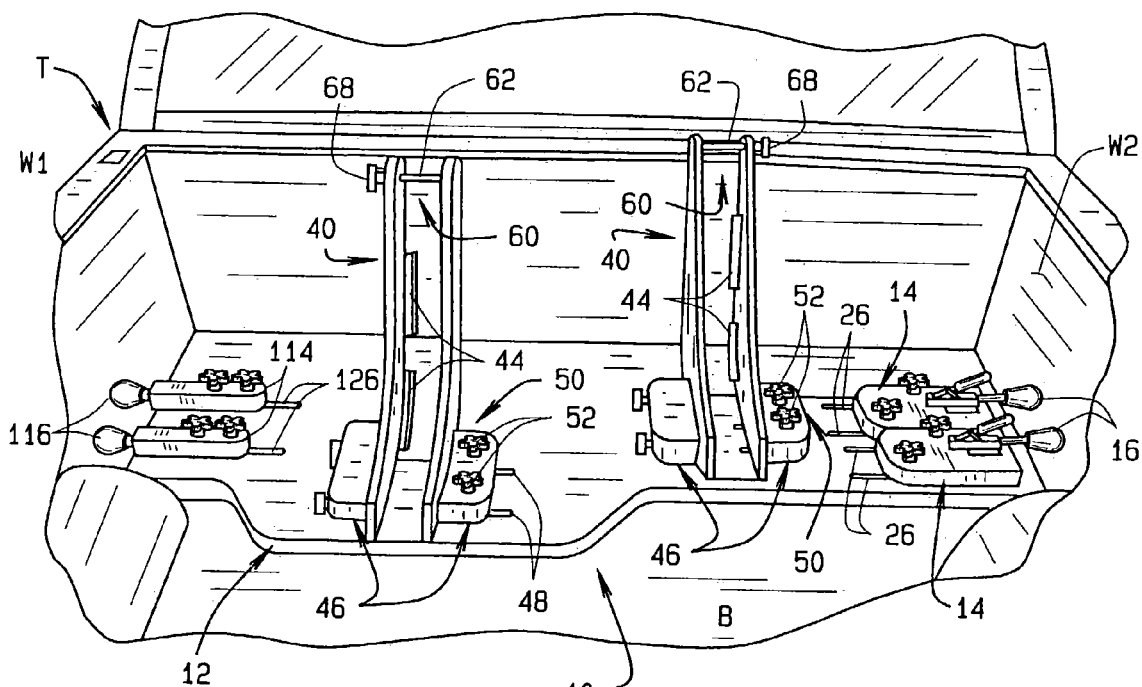
FIGS. 1 and 2 are perspective views of the carrier of the present invention installed in the bed of a pickup truck.
Figure 2:
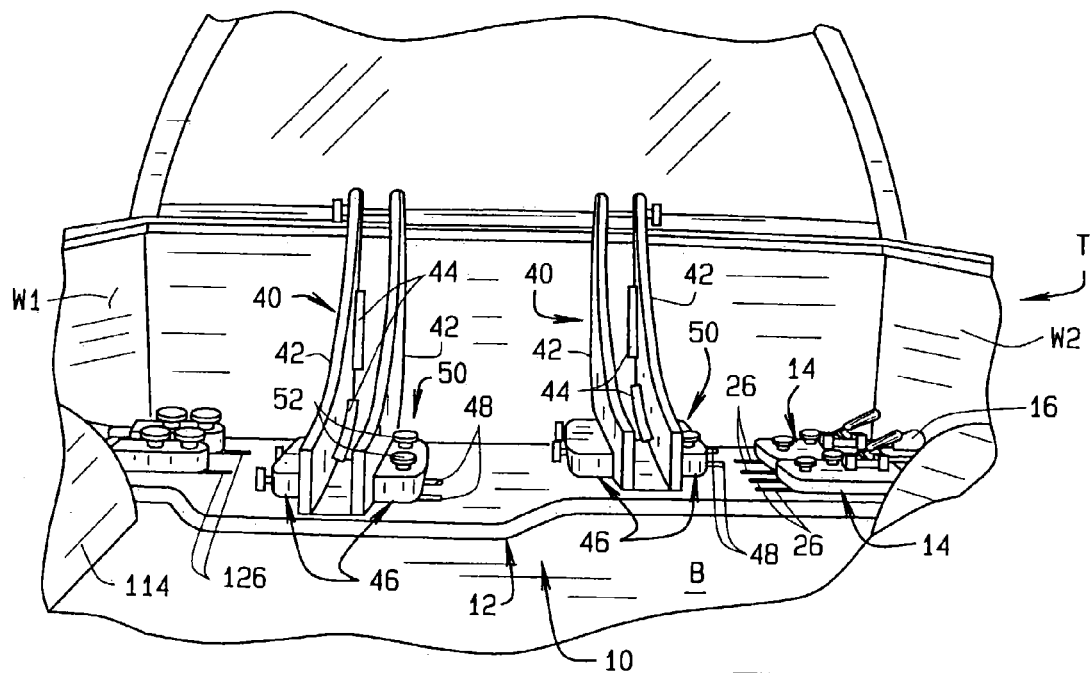
Figure 3:
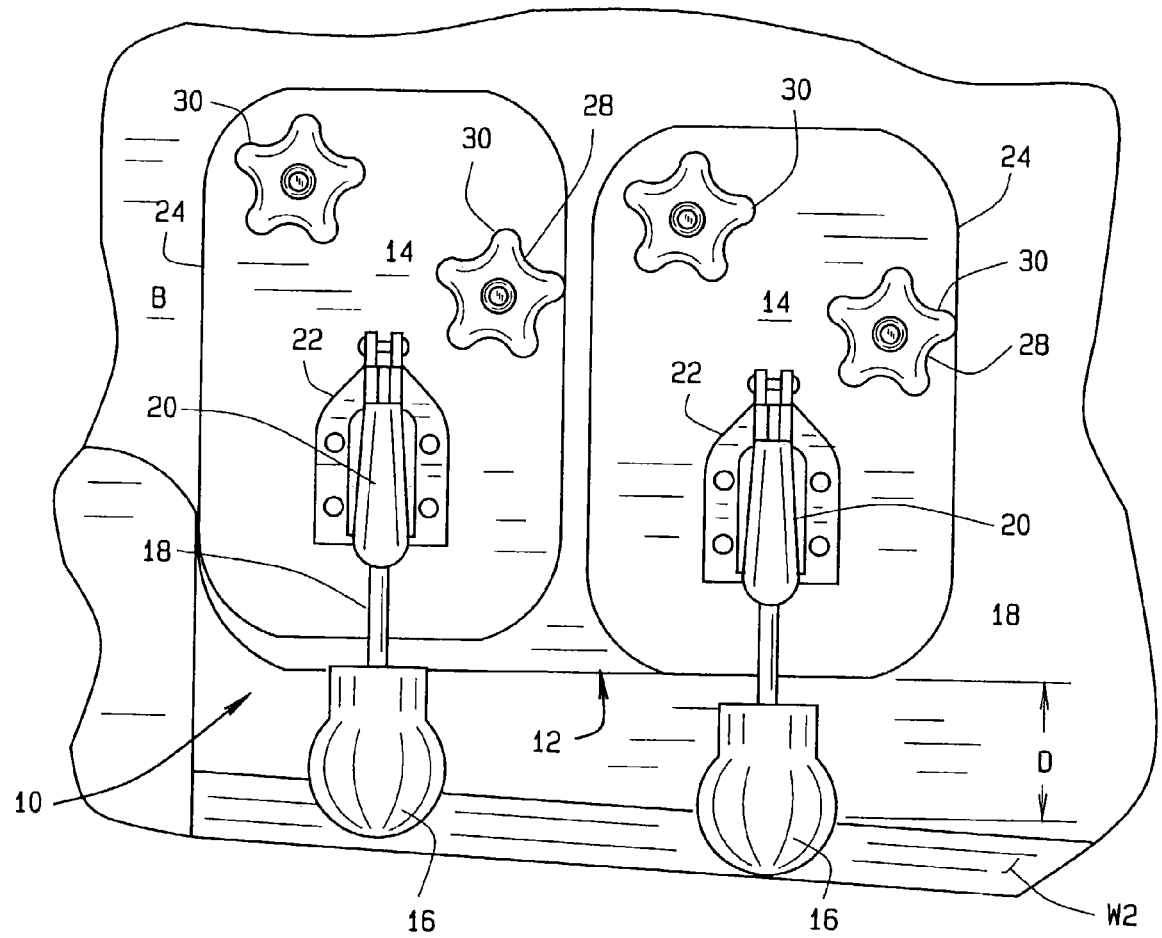
FIG. 3. is a plan view of an adjustment mechanism of the carrier for installing it in different size truck beds.

Carrier 10 first comprises a base plate 12 installed on top of the truck bed and resting thereon. The length of the base plate 12 is slightly less than the width of the truck bed. Thus, if one side of plate 12 is abutted against one sidewall W1 of the truck bed, there is a space D (see FIG. 3) between the other end of the base plate and the opposite sidewall of the truck bed. A pair of adjustable stops 14 are mounted side-by-side at the end of plate 12 which is spaced form the sidewall. As particularly shown in FIG. 3, stop includes a bumper pad 16 attached to the end of a movable shaft 18 whose position relative to the sidewall is adjustable by a lever arm 20. The shaft is, in turn, attached to a fitting 22 mounted on a base 24 of the stop. The fitting is a locking fitting. Thus, when the base plate is fitted on the bed of the truck, the bumper pads are movable into contact with a sidewall W2 of the truck, and when properly positioned, locked in place. For further adjustment, each base 24 is slidably movable in a pair of tracks 26 formed in the top of the base plate and extending inwardly from the side of the plate longitudinally thereof. A locking mechanism 28 protrudes through the base and into each track. The mechanism has a handle 30 to lock the base in a desired position. The locking mechanism 28 facilitates gross adjustment of the stops 14 relative to the truck sidewall, and the bumper pads a fine adjustment. As shown in FIG. 1, a pair of adjustable stops 114 are installed on the opposite end of base plate 12 as well. The stops are movable in tracks 126. On this side of the plate, the bumper pads 116 are also adjusted to contact the sidewall of the truck bed, even though this end base plate 12 abuts against the sidewall. Here, the pads provide a cushioning effect. Those skilled in the art will understand that for some installations, both sets of adjustable stops will be used to install the base plate in the truck bed.

Figure 4:
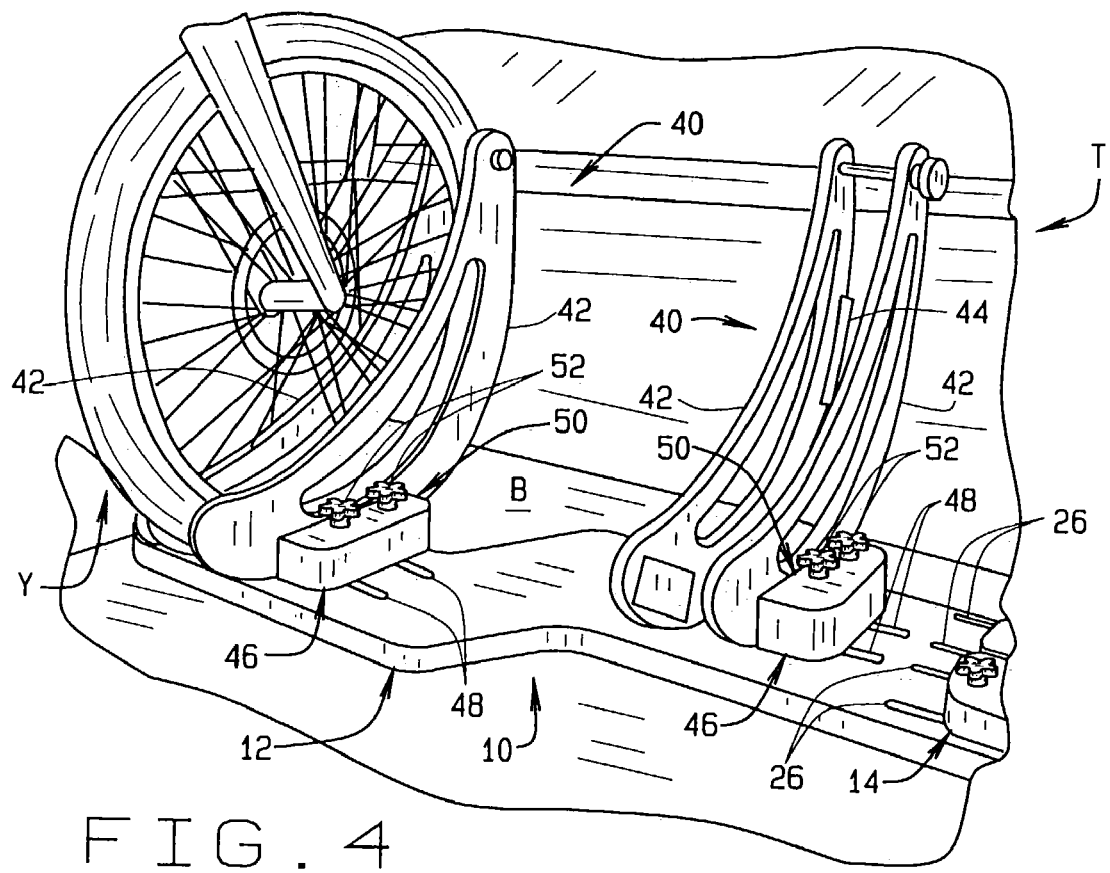
FIGS. 4 and 5 illustrate how a bicycle is installed in a saddle of the carrier; and, FIGS. 6 and 7 illustrate how an offset feature of the carrier allows two bicycles to be installed in the carrier in a staggered manner.
Figure 5:
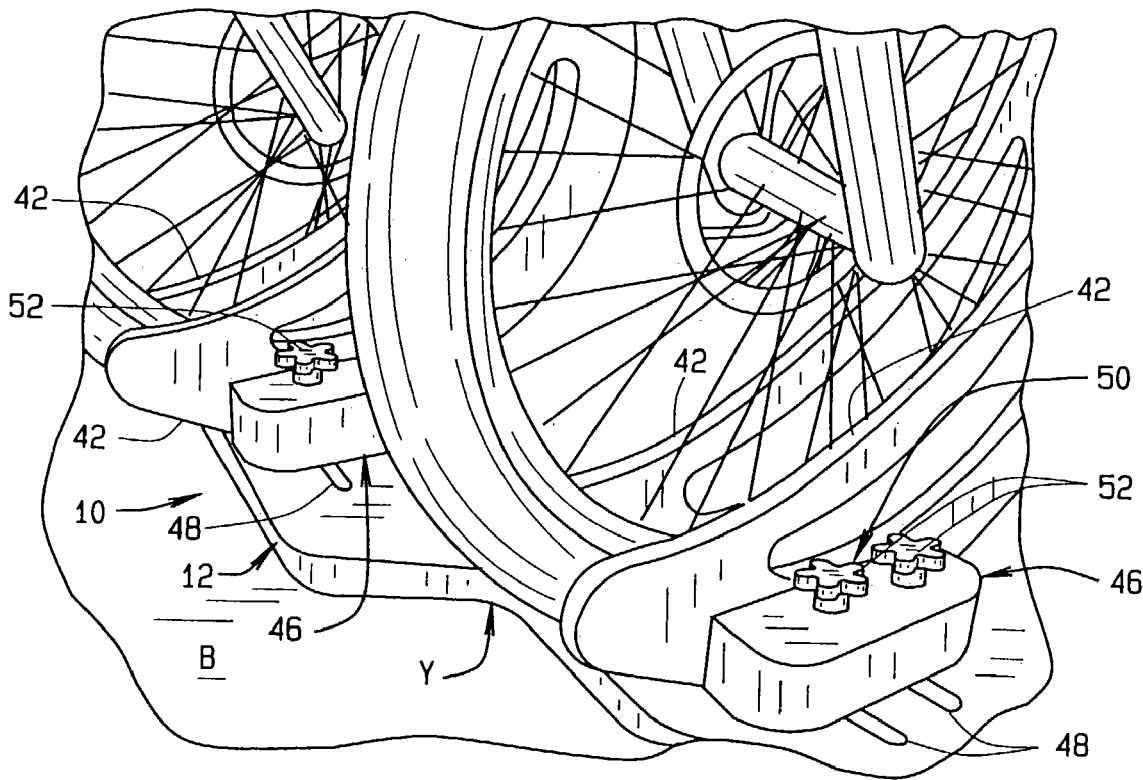

Next, cargo carrier 10 includes a pair of saddles 40 installed side-by-side on base plate 12. While the base plate extends horizontally, each saddle includes two spaced apart risers 42 which extend vertically upwardly from the base plate. As best shown in FIG. 4, the risers 42 are curved risers, their curvature generally corresponding to that of the bicycle wheel captured in the saddle. One or both of the risers may have cushioning pads 44 installed on the inside face of the riser to prevent damage to the bicycle wheel.

The base of each riser 42 is attached to a mounting block 46 which mounts to base plate 12 in the same manner as base 24 of the adjustable stops 14. Tracks 48 are formed in the top of base plate 12 so the position of the respective mounting blocks is adjustable. A locking mechanism 50 corresponding to locking mechanism 28 is also provided for locking the mounting blocks in place. In addition to adjustably positioning the mounting blocks 46 on base plate 12, the position of the risers 42 is separately adjustable once the mounting blocks are locked into place. Positioning screws (not shown) extend horizontally through each mounting block and attach to the base of the riser. Positioning handles 52 on the outside of the mounting block allow a user to then separately adjust the position of the riser. Thus, if a bicycle wheel has a slightly larger or smaller tread than expected, one or both of the risers comprising the saddle is readily adjusted to accommodate the wheel between the risers.

Each riser next includes an attachment or holding mechanism 60 for attaching the front wheel FW of a bicycle to the saddle and holding it in place while the pickup is driven from one location to another. The mechanism 60 includes a screw 62 which extends between the risers, at the upper end of the risers (see FIG. 8). One end of screw 62 threads into an opening 64 in one of the risers. The other end of the screw extends through an opening 66 in the other riser and is attached to a handle 68. To mount a bicycle on the carrier, the screw 62 is first withdrawn from the opening between the risers. The front wheel (FW) of the bicycle is then positioned between the risers. The screw is then inserted through opening 66, across the space between the risers in front of the rim on which the wheel is mounted, and then threaded through the opening 64 in the other riser. The screw 62 then keeps the bicycle wheel in place, while the risers 42 are adjustable to confine the wheel between them. The cushioning pads 44 keep the wheel and the front fender of the bicycle from being damaged. Other types of attachment mechanisms can be used in place of the mechanism 60 without departing from the scope of the invention.

Figure 6:
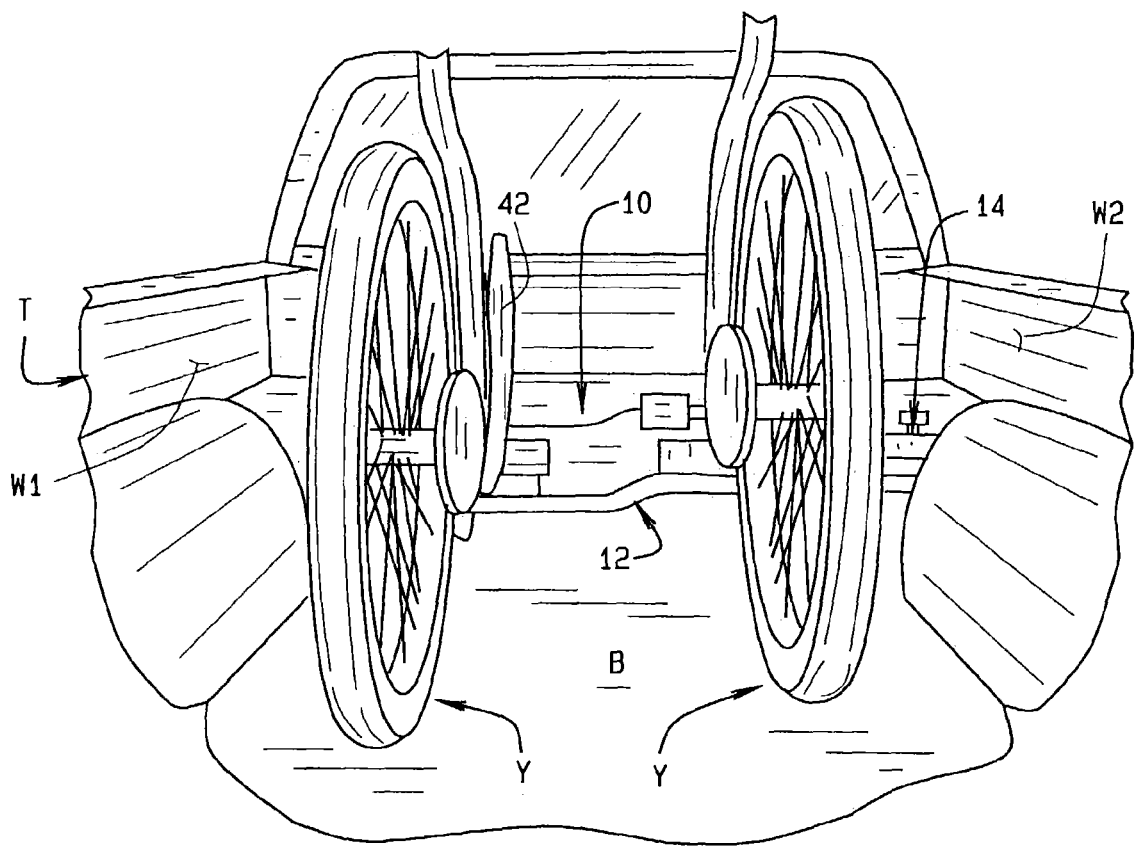
Figure 7:
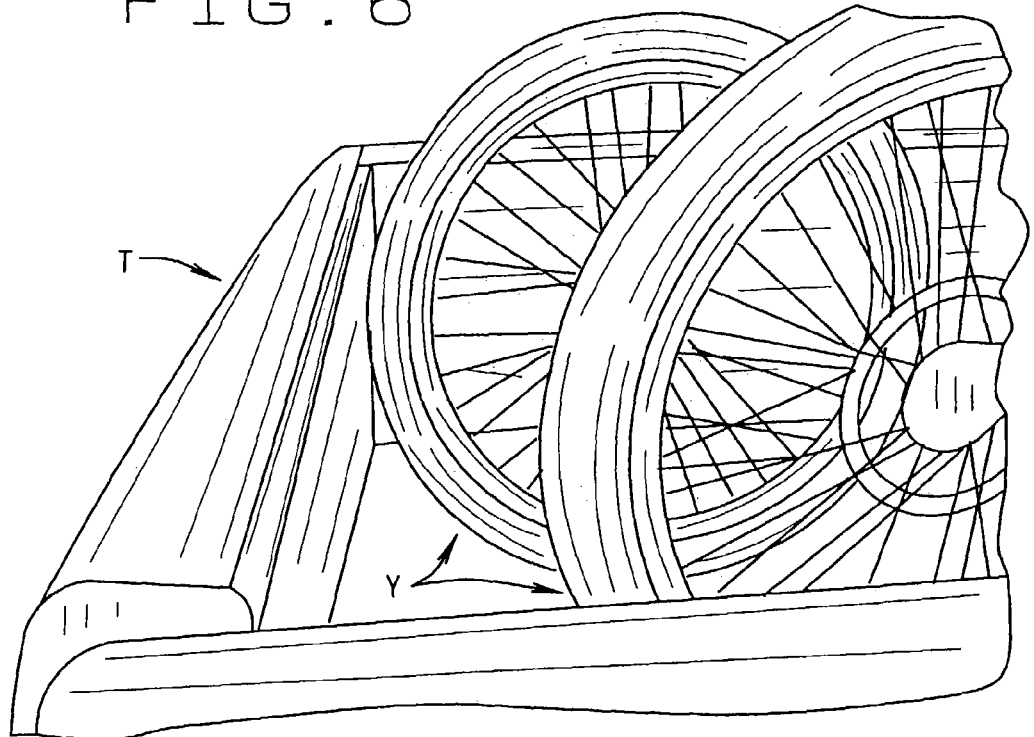

It will be noted that base plate 12, rather than extending straight across the truck bed has one section offset from the rest of the base plate. If two bicycles are mounted on the carrier as shown in FIGS. 6 and 7, one bicycle is mounted on each offset portion. This has the advantage of keeping the handlebars of the respective bicycles from interfering with each other when the bicycles are being loaded onto the carrier and transported.

Figure 8:
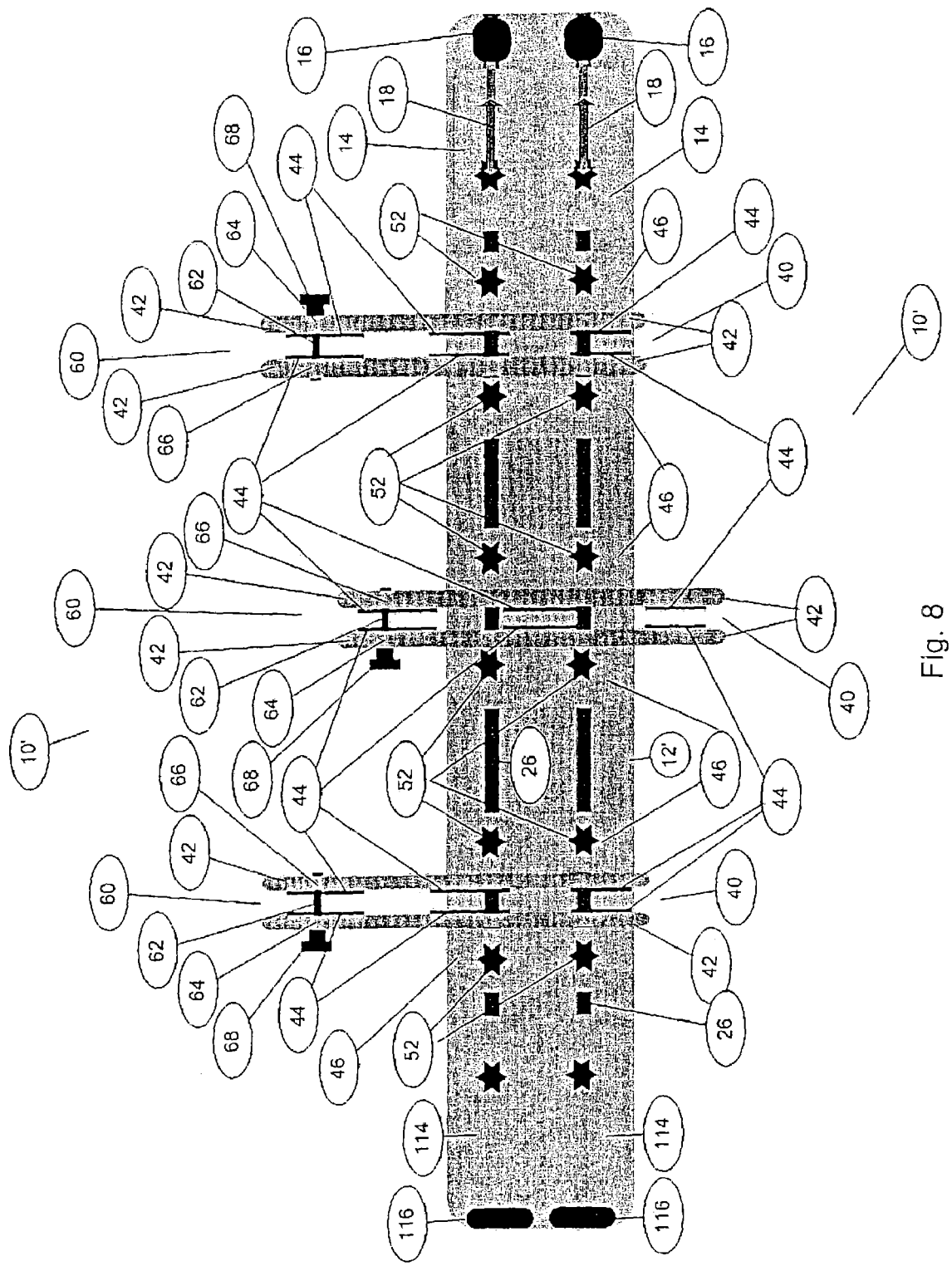
FIG. 8 is a plan view of a second embodiment of the carrier.
Figure 9:
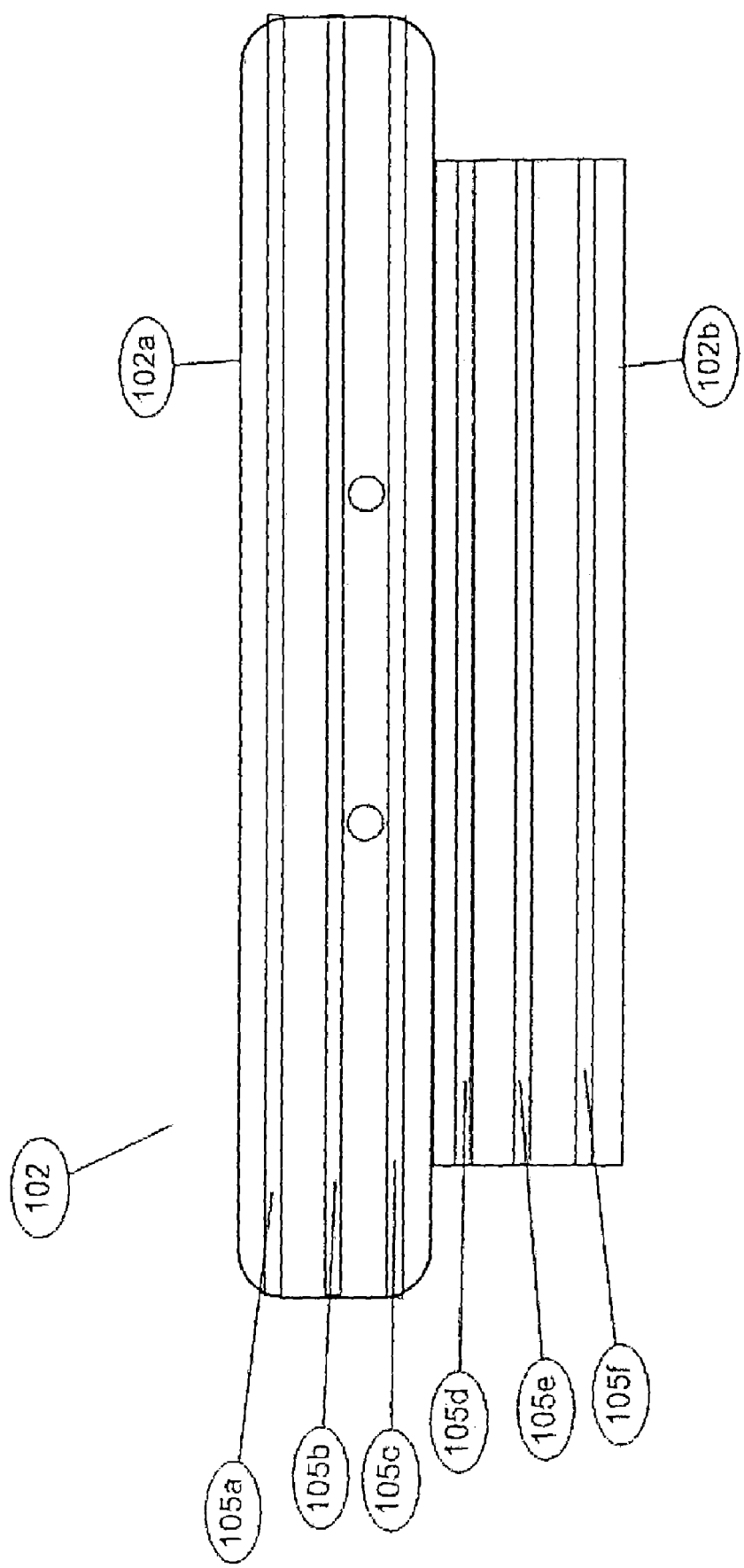
FIG. 9 is a plan view of a base plate of a third embodiment of the carrier.

As shown in FIG. 8, a base plate 12' extends straight across the truck bed could be used. This embodiment also includes provisions for three saddles 40 for carrying three bicycles instead of two.

Figure 10:
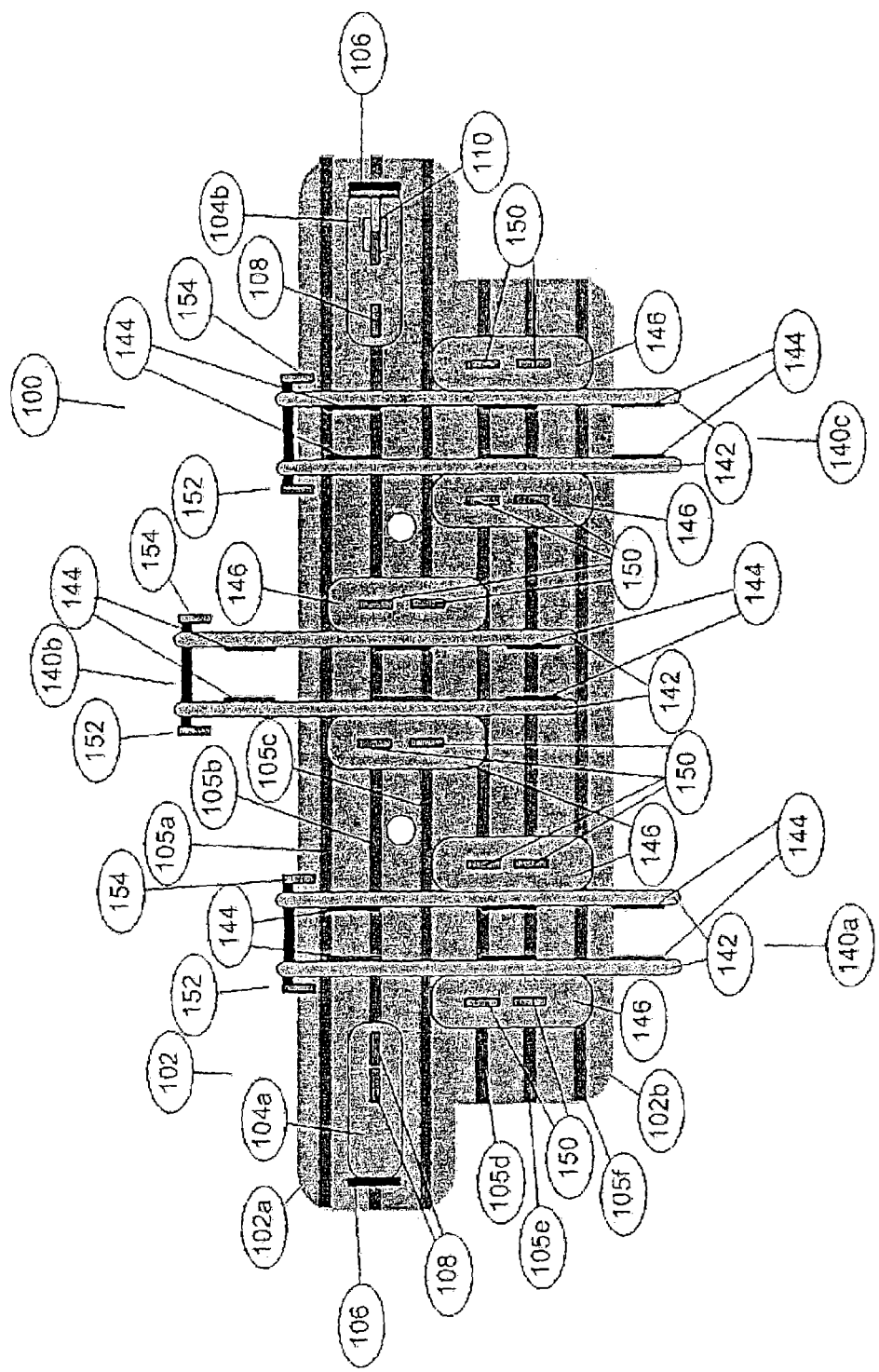
FIG. 10 is a plan view of the third embodiment with saddles installed in tracks formed in the base plate.
Figure 11:
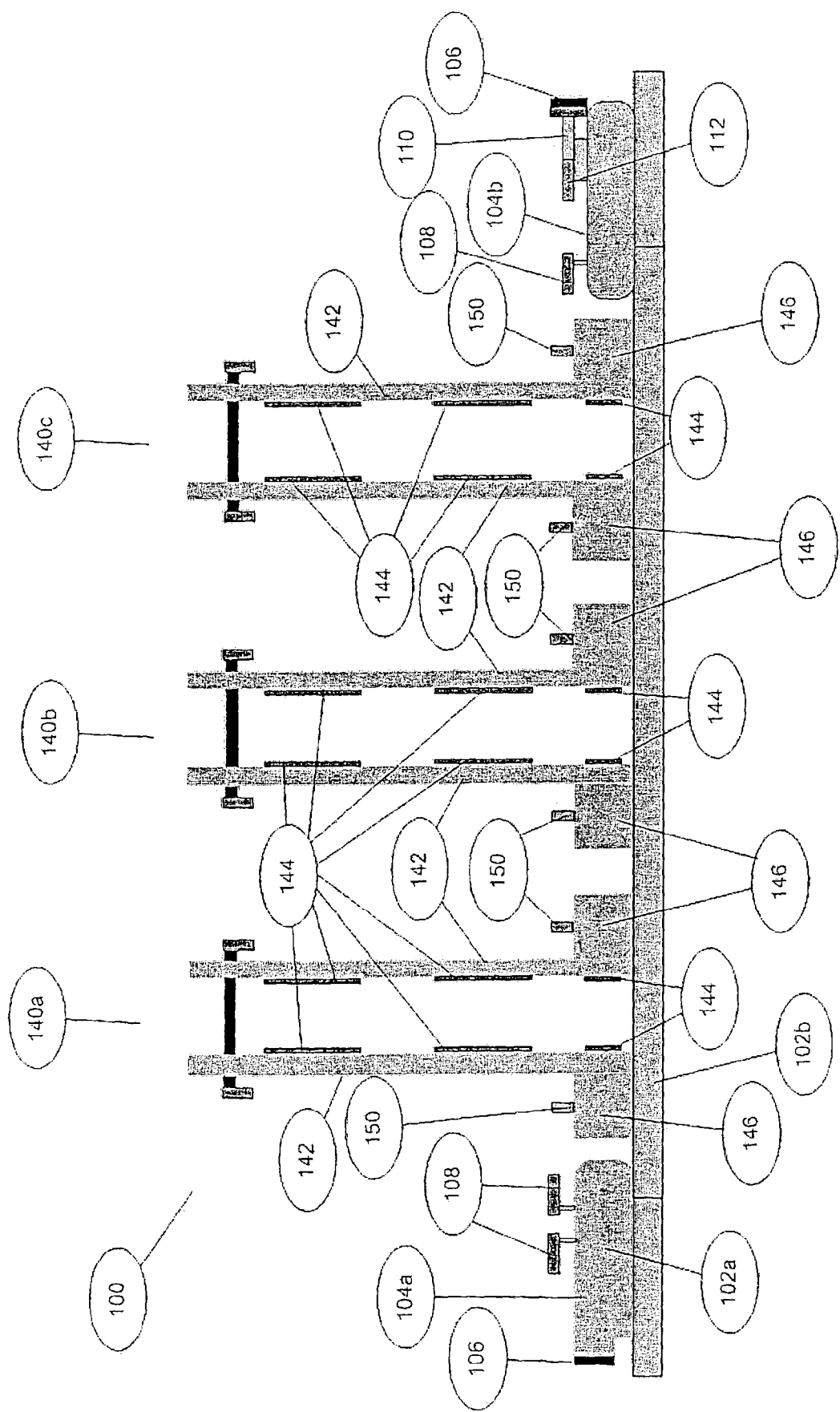
FIG. 11 is an end elevation view of the embodiment.
Figure 12:
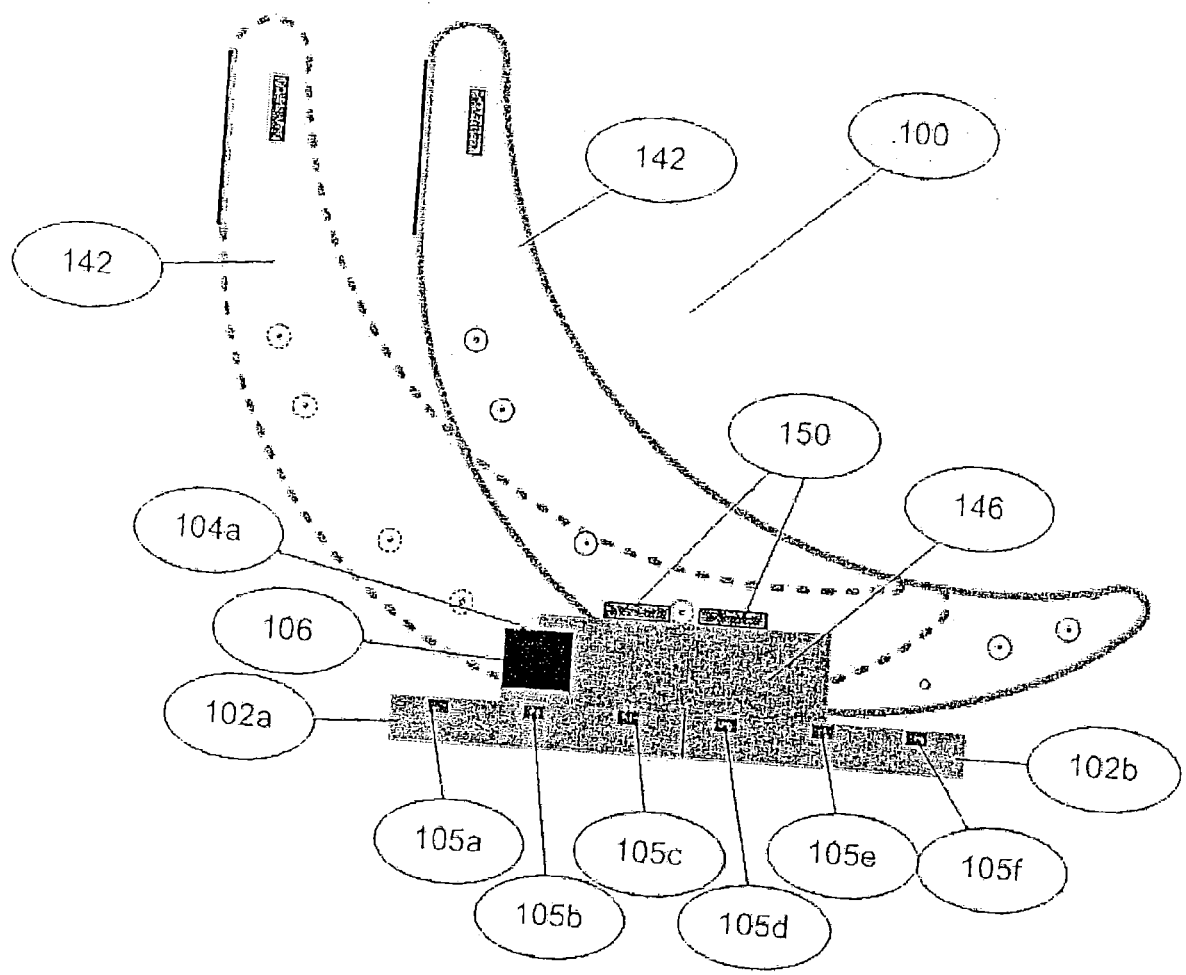
FIG. 12 is an elevation view of the embodiment illustrating positioning of a saddle riser.
Figure 13:
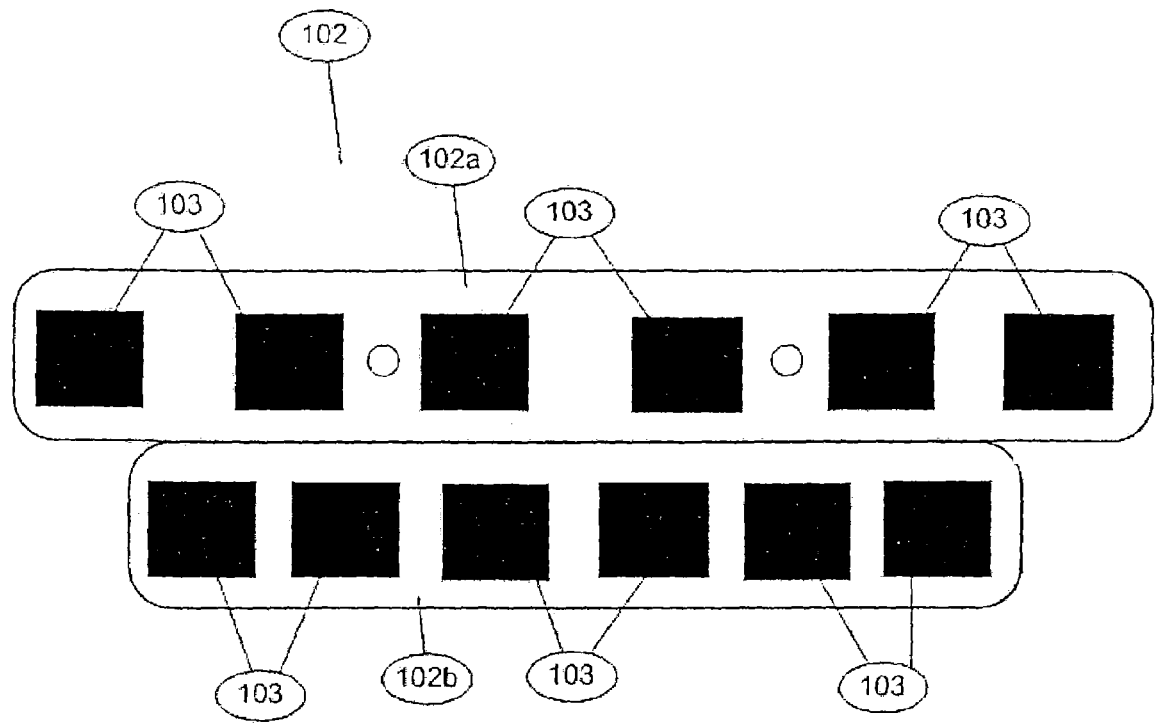
FIG. 13 is a bottom plan view of the base plate.

Referring now to FIGS. 9–14B, a third embodiment of the cargo carrier of the present invention is indicated generally 100 in FIGS. 10 and 11. Carrier 100 includes a base plate 102 installed on top of truck bed B. Base plate 102 has two sections 102A and 102B, section 102A being longer than section 102B. The length of the longer base plate section 102A is slightly less than the width of truck bed B. As in the previously described embodiments, when one end of plate 102A is abutted against one sidewall of truck bed B, there is a space between the other end of the base plate and the opposite truck bed sidewall. Each base plate section has a plurality of tracks 105 extending longitudinally of the section across the entire length of the respective sections. The tracks 105a–105c in section 102A, and 105d–105f in section 102B extend parallel to each other across their respective sections and are equidistantly spaced from each other. The tracks allow the articles carried by cargo carrier 100 to be properly spaced from each other when installed on the carrier so they do not damage each other. Further, and as shown in FIG. 13, pads 103 are attached to the underside of each base plate section to prevent damage to the truck bed when cargo carrier 100 is installed in truck T.

Figure 14A:
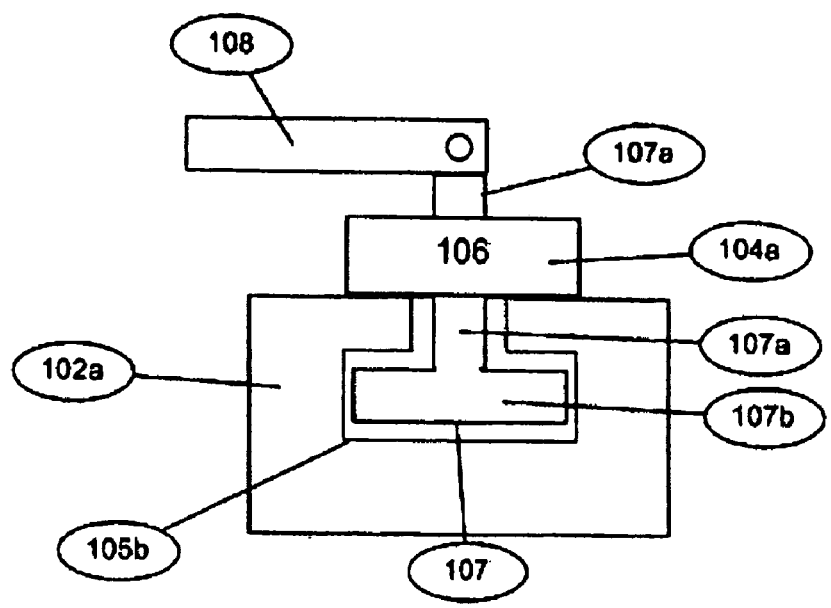
FIGS. 14A and 14B are side views of a base plate section illustrating alternate track constructions for installing carrier components to the base plate; and, FIG. 15 is a representation of a pickup truck with the carrier of the present invention installed.
Figure 14B:
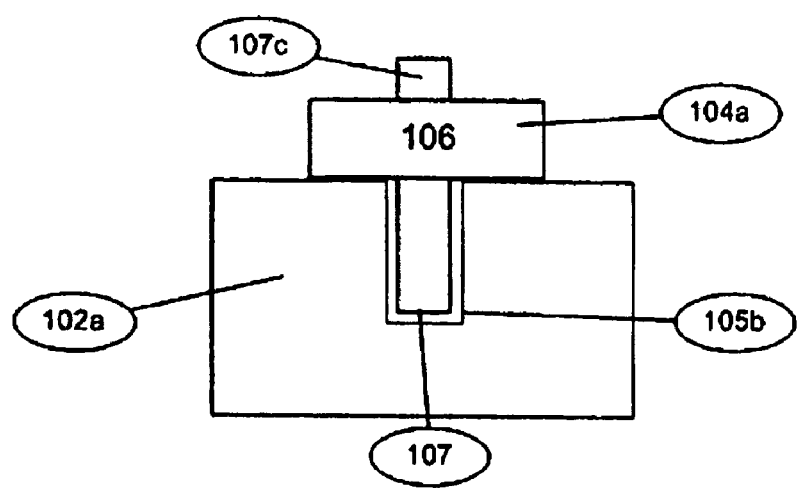

A pair of adjustable stops 104A, 104B are mounted on the opposite ends of base plate section 102A. Each stop is fitted to the base plate section as shown in FIGS. 14A and 14B. In FIG. 14A, track 105b is shown to have an inverted T shape when viewed in cross-section. Stop 104A has a post 107 having a shank 107a and an enlarged head 107b. Shank 107a extends through the body of stop 104A and its upper end attaches to a lever mechanism 108 for locking the stop in place. When the lever is engaged, head 107b of the post is drawn upwardly against the underside of the shoulder formed where track 105b changes size (i.e., engaging the underside of the lip as shown in FIG. 14A). This locks the stop in place until the lever is released.

Alternately, and as shown in FIG. 14B, track 105b comprises a straight walled slot and post 107 only includes a shank which allows the stop to be moved through the track. Now, the upper end of post 107 includes a tab 107c for tightening the post against the bottom of the track to lock the stop in place. It will be understood by those skilled in the art, that the other tracks in sections 102A and 102B are identically formed to the track 105b shown in FIG. 14A or 14B, and that the other components of cargo carrier 100 have similar posts for installing the components to the base plate and adjusting their positions thereon.

Referring to FIGS. 10 and 11, stop 104A is positioned so its pad 106 bears against sidewall W1 of the truck. The stop has a pair of posts 107 with associated locking levers 108 to lock the stop in place with pad 106 abutting sidewall W1. On the other stop 104B, pad 106 is attached to the outer end of a spring loaded rod 110 which extends longitudinally of the stop. A lever 112 similar to locking lever 108 is connected to the inner end of rod 110 to move the bumper pad against sidewall W2 of truck T. This allows stop 104B to be spaced away from the sidewall as shown in FIG. 10, with pad 106 being moved against the sidewall by moving lever 112. When this is done, base plate 102 is locked in place until lever 112 is released.

Cargo carrier 100 includes a plurality of saddles 140. Three saddles 140a-140c are shown in the drawings installed side-by-side on base plate 102. As before, each saddle 140 includes two spaced apart risers 142 which extend vertically upwardly from base plate 102. In FIG. 10, the saddles are shown installed on base plate 102 in a staggered formation with the two outside saddles 140a and 140c attached to base plate section 102B, and middle saddle 102b attached to base section 102A. Those skilled in the art will understand that this configuration is representative only. For example, the installation shown in FIG. 10 could be reversed with saddles 140a and 140c attached to base plate section 102A and saddle 140b attached to section 102B. Or, all the saddles could be attached to the same section. Only one or two of the saddles could be installed, or more than three saddles could be used, all within the scope of the present invention.

As shown in FIG. 12, a riser 142 is a curved riser whose curvature generally corresponds to that of a bicycle wheel held by the saddle. Each riser has a plurality of cushioning pads 144 on their inside faces so to cushion and protect the article (bicycle wheel) supported by the saddle. Although not shown in the drawings, other riser construction could include a rectangular or round post on which cushioning pads are mounted to protect an article supported by the saddle. Such risers are interchangeable with the risers 142 so cargo carrier 100 can be used to safely transport a wide variety of articles.

The base of each riser 142 is attached to a mounting block 146 which mounts to base plate 102 in the same manner as the stops 104A, 104B. That is, each mounting block 146 has a post 107 which fits into the tracks 105a–105f. The blocks are secured in the tracks as previously described. For greater stability, each mounting block 146 includes two spaced posts, the distance between the posts corresponding to the distance between two of the tracks 105a–105f. Accordingly, the position of each riser 142, forward or back, can be adjusted as indicated by the dashed representation of riser 142 in FIG. 12. A locking mechanism 150 corresponds to the locking mechanism 108 on stops 104A, 104B to lock the mounting blocks in place.

Each saddle next includes an attachment mechanism 152 for holding the risers 142 together once an article is installed between the risers. Mechanism 152 includes a screw 154 extending between the risers at their upper end. This is as shown in FIGS. 10 and 11. Each screw 154 threads through an opening in the upper end of one of the risers, across the space between the risers, and through a corresponding opening in the other riser forming the saddle. Operation of the screws is as previously described. Again, other types of attachment mechanisms can be used in place of the mechanism 60 without departing from the scope of the invention.

Cargo carrier 10, 10', or 100 can be made of wood, a heavy duty metal, or a high impact plastic. The base plate can be formed in segments which detach from each other when the carrier is not in use to make it easy to store the carrier. In its disassembled form, the carrier can be stored in a bag, or small case or box which can be placed in the bed of the truck, or in the truck cab for easy access. Those skilled in the art will understand that while the cargo carrier is described for use with pickup trucks, it can also be used in closed trucks such as panel trucks, or over-the-road trucks where there may be a need to sometimes provide a cargo carrying capability. Also, while the above description is for use of only one cargo carrier, it will be appreciated that two or more cargo carriers could also be used. Thus, for example, where the article being transported is particularly large, or flimsy, or very heavy, two cargo carriers can be used, one for holding and supporting each end of the article. In some circumstances, it is even advisable to use three or more cargo carriers, one for supporting each end of the article, and one or more carriers for supporting the article intermediate its ends.

The advantage of the cargo carrier of the present invention is its low cost, ease of assembly, disassembly, and storage, that it can be used to support and transport more than one article at a time, and its adjustability both as to the truck bed in which it is installed, and the articles being supported, so to be able to transport a wide variety of articles. The cargo carrier further simplifies how articles being transported are arranged so to maximize the number of articles which can be transported at one time, and to do so while protecting the articles from damage. As an example, with respect to the transport of bicycles or motorcycles as earlier described, it will be noted that substantial space is still available in the bed of the truck for other equipment such as apparel, camping equipment, etc.

In view of the above, it will be seen that the several objects and advantages of the present invention have been achieved and other advantageous results have been obtained.

The invention claimed is:

1. A carrier (10) removably installed in a bed (B) of a truck (T) for transporting articles (Y) from one location to another, comprising:
   a base plate set on the truck bed with the width of the plate substantially corresponding to the width of the truck bed;
   a plurality of saddles each of which separately supports an article, each saddle comprising a pair of risers fitted into the base plate and adjustable along the width thereof, with a spacing between adjacent saddles being such that articles supported thereon do not interfere with each other;
   means for adjusting the spacing between the risers so the saddles can support articles of different sizes; and,
   a latching means for capturing an article in a saddle for the saddle to hold the article in place during transport.

2. The carrier of claim 1 in which the width of the base plate is slightly less than the width of the truck bed, and the carrier includes an adjustment mechanism for rigidly securing the base plate between sidewalls (W1, W2) of the truck bed.

3. The carrier of claim 1 wherein the latching means includes an adjustment screw for tightening the risers together after an article is set between them, thereby to hold the article in place.

4. The carrier of claim 1 further including pads located on an inner face of each riser to cushion the article held between the risers and prevent damage to the article.

5. The carrier of claim 1 in which the risers are curved risers.

6. The carrier of claim 5 in which the articles carried by the carrier are bicycles or motorcycles and the risers are curved risers whose curvature generally corresponds to that of a bicycle tire or motorcycle tire.

7. The carrier of claim 1 wherein the saddle includes a pair of mounting blocks mounted to the base plate with one of the risers supported by each mounting block.

8. The carrier of claim 7 wherein the base plate has a plurality of spaced tracks extending the width of the base plate parallel to each other, the mounting blocks having pins received in at least two of the tracks to mount the mounting blocks to the track.

9. The carrier of claim 8 further including locking means for locking each mounting block in place once it has been positioned along the base plate.

10. The carrier of claim 8 wherein the tracks are equidistantly spaced from each other, thereby allowing the mounting blocks for one saddle to be mounted in an offset relationship from one of the other saddles thereby to stagger the position of the articles carried by the saddles.

11. The carrier of claim 10 in which the base plate has two sections, a first section whose width substantially corresponds to the width of the truck bed, and a second section shorter in width than the first section.

12. The carrier of claim 11 in which the second section is centered with the first section.

13. The carrier of claim 12 in which the second section has the same number of tracks as the first section, the spacing between tracks also corresponding that of the tracks in the first section.

14. The carrier of claim 12 further including pads fitted to the underside of the base plate to prevent the base plate from scratching the surface of the truck bed when installed.

15. A carrier kit removably installed in a truck bed (B) for transporting articles (Y) from one location to another, comprising:
   a base plate set on the truck bed with the width of the plate substantially corresponding to the width of the truck bed, the base plate has two sections, a first section whose width substantially corresponds to the width of the truck bed, and a second section shorter in width than the first section, and a plurality of spaced tracks extending parallel to each other the width of each base plate section, the tracks being equidistantly spaced from each other;
   a saddle fitted into the base plate for supporting an article in place during transport of the article, the location of the saddle being adjustable along the width of the base plate; and,
   a latching mechanism for capturing an article in the saddle for the saddle to hold the article in place during transport; and,
   storage means for storing the components when the carrier is disassembled.

16. The carrier kit of claim 15 further including pads fitted to the underside of each base plate section to prevent the base plate from scratching the surface of the truck bed when installed.

17. The carrier kit of claim 15 further including a plurality of saddles each of which separately supports an article, each saddle comprising a pair of risers with the articles being held in place between the risers and a pair of mounting blocks mounted to the base plate with one of the risers supported by each mounting block, the mounting blocks being fitted into the base plate and adjustable along the width of the base plate, the saddles being fitted into the base plate with a spacing between adjacent saddles such that articles supported thereon do not interfere with each other.

18. The carrier kit of claim 17 further including means for adjusting the spacing between the risers so the saddles can support articles of different sizes.

19. The carrier kit of claim 17 wherein the latching means includes an adjustment screw for tightening the risers together after an article is set between them, thereby to hold the article in place.

20. The carrier kit of claim 17 further including pads located on an inner face of each riser to cushion the article held between the risers and prevent damage to the article.

21. The carrier kit of claim 20 in which the risers are curved risers.

22. The carrier kit of claim 20 in which the articles carried by the carrier are bicycles or motorcycles and the risers are curved risers whose curvature generally corresponds to the that a bicycle tire or motorcycle tire.

* * * * *